UNITED STATES PATENT OFFICE 2,642,429

TERTIARY-AMINOALKYL 4 - SUBSTITUTED-2 - (TERTIARY - AMINOALKOXY)BENZOATES AND THEIR SYNTHESIS

Raymond O. Clinton, North Greenbush, and Stanley C. Laskowski, Menands, N. Y., assignors to Sterling Drug Inc., New York, N. Y., a corporation of Delaware No Drawing. Application September 5, 1951, Serial No. 245,246

23 Claims. (Cl. 260—247.2)

This invention relates to tertiary-aminoalkyl 4 - substituted - 2 - (tertiary-aminoalkoxy)benzoates and to their synthesis.

The compounds of our invention have the general formula

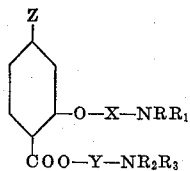

where Z is nitro or amino, X and Y are each lower alkylene radicals, and $NRR_1$ and $NR_2R_3$ are each tertiary-amino radicals. These compounds are useful as pharmaceuticals and as intermediates in the preparation of pharmaceuticals, for instance, in the preparation of the corresponding quaternary salts which are disclosed and claimed in our copending application Serial No. 245,249, filed September 5, 1951.

In the above general formula, the lower alkylene radicals designated as X and Y each has two to four carbon atoms and each has its two free valence bonds on different carbon atoms. Thus, X and Y include such examples as $-CH_2CH_2-$, $-CH_2CH_2CH_2-$ $-CH_2CH(CH_3)$ $-CH_2CH_2CH_2CH_2-$, $-CH_2CH(CH_3)CH_2-$ and the like. For a given compound, the lower alkylene radicals X and Y can be alike or different. The tertiary-amino radicals, shown above as $NRR_1$ and $NR_2R_3$, each comprehend dialkylamino radicals where R, $R_1$, $R_2$ and $R_3$ are lower alkyl groups, alike or different, and each alkyl group having one to six carbon atoms, such dialkylamino radicals including dimethylamino, diethylamino, ethylmethylamino, diisopropylamino, ethyl-n-propylamino, di-n-butylamino, di-n-hexylamino, and the like. Further, the tertiary-amino radicals designated as $NRR_1$ and $NR_2R_3$ each encompassed saturated N-heteromonocyclic radicals having five to six ring atoms, illustrated by examples such as 1-piperidyl; (lower alkylated)-1-piperidyl such as 2-methyl-1-piperidyl, 3-ethyl-1-piperidyl, 4-methyl-1-piperidyl, 2,6-dimethyl-1-piperidyl; 1-pyrrolidyl; (lower alkylated)-1-pyrrolidyl such as 2-methyl-1-pyrrolidyl, 2,5-dimethyl-1-pyrrolidyl; 4-morpholinyl; and the like. For a given compound, $NRR_1$ and $NR_2R_3$ can be alike or different.

The compounds of our invention can be prepared by the procedure illustrated by the following series of reactions where X, Y, $NRR_1$ and $NR_2R_3$ are defined as above, $R_4$ is a lower alkyl radical and halogen is chlorine, bromine, iodine or fluorine:

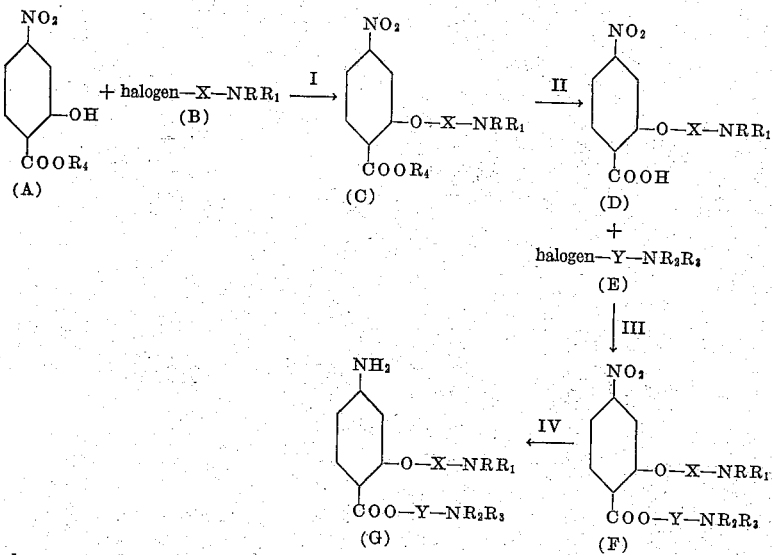

In step I, a lower alkyl 4-nitro-2-hydroxybenzoate (A) is converted into a lower alkyl 4-nitro-2-(tertiary-aminoalkoxy)benzoate (C) by reaction with a tertiary-aminoalkyl halide (B). In step II, the lower alkyl 4-nitro-2-(tertiary-aminoalkoxy)benzoate (C) is saponified to yield the corresponding 4-nitro-2-(tertiary-aminoalkoxy)-benzoic acid (D), which, in step III, is converted into a tertiary-aminoalkyl 4-nitro-2-(tertiary-aminoalkoxy)benzoate (F) by reaction with a tertiary-aminoalkyl halide (E). In step IV, the 4-nitro ester (F) is reduced to yield the corresponding tertiary-aminoalkyl 4-amino-2-(tertiary-aminoalkoxy)benzoate (G). This series of reactions is illustrated as follows: Ethyl 4-nitro-2-hydroxybenzoate, preferably in the form of an alkali metal salt, is reacted with a 2-diethylaminoethyl halide, preferably the chloride, to yield ethyl 4-nitro-2-(2-diethylaminoethoxy)-benzoate; this ethyl ester is saponified to yield the corresponding acid; the acid is treated with 2-(1-piperidyl)ethyl halide to form 2-(1-piperidyl)ethyl 4-nitro-2-(2-diethylaminoethoxy)benzoate; and this 4-nitro ester is reduced to form the corresponding 2-(1-piperidyl)ethyl 4-amino-2-(2-diethylaminoethoxy)benzoate.

Step I is carried out preferably using a lower alkyl 4-nitro-2-hydroxybenzoate in the form of a metal derivative, with a tertiary-aminoalkyl halide. Alternatively, step I can be carried out using a lower alkyl 4-nitro-2-hydroxybenzoate itself, however, with a resulting decrease in yield of the lower alkyl 4-nitro-2-(tertiary-aminoalkoxy)benzoate. The lower alkyl 4-nitro-2-(tertiary-aminoalkoxy)benzoates are disclosed and claimed in our copending application Serial No. 245,244, filed September 5, 1951.

Step I can also be carried out stepwise, that is, by first haloalkylating the lower alkyl 4-nitro-2-hydroxybenzoate (A) to form the lower alkyl 4-nitro-2-(haloalkoxy)benzoate which is then treated with a secondary amine having the formula $HNRR_1$. The first step can be accomplished by treating a lower alkyl 4-nitro-2-hydroxybenzoate or a metal derivative thereof with a haloalkylating agent such as a haloalkyl para-toluenesulfonate, haloalkyl benzenesulfonate, dihaloalkane, etc. As illustrations of this stepwise procedure, ethyl 4-nitro-2-hydroxybenzoate is haloalkylated by treating its sodium salt with 2-chloroethyl para-toluenesulfonate to form ethyl 4-nitro-2-(2-chloroethoxy)benzoate which then is treated with diethylamine or piperidine to form ethyl 4-nitro-2-(2-diethylaminoethoxy)benzoate or ethyl 4-nitro-2-[2-(1-piperidyl)ethoxy]benzoate, respectively.

The esterification step III is carried out preferably by heating a 4-nitro-2-(tertiary-aminoalkoxy)benzoic acid with a tertiary-aminoalkyl halide. In practice we found this reaction could be satisfactorily and conveniently carried out in refluxing propanol or ethanol using the 4-nitro-2-(tertiary-aminoalkoxy)benzoic acid in the form of its hydrochloride addition salt (alternatively, the free base form can be used) and using a tertiary-aminoalkyl chloride.

The reduction step IV is carried out either by chemical methods or by catalytic hydrogenation. Suitable chemical reducing agents include iron and hydrochloric acid, ferrous sulfate and ammonia, tin and hydrochloric acid, sodium hydrosulfite, etc. In practicing our invention, we used preferably iron and hydrochloric acid. Catalysts suitable when catalytic hydrogenation is employed include Raney nickel, platinum, palladium or other catalysts generally effective to catalyze hydrogenation of nitro groups to amino groups.

The tertiary-aminoalkyl 4-substituted-2-(tertiary-aminoalkoxy)benzoates can be employed in the form of their free bases or in the form of their salts with relatively non-toxic organic or inorganic acids. In practicing our invention, we found it convenient to isolate our compounds in the form of their hydrochlorides. However, other acid addition salts are within the scope of our invention. Such salts include the hydrobromides, phosphates, sulfates, citrates, sulfamates, tartrates, succinates, acetates, benzoates, oleates, and the like.

The following examples illustrate specific embodiments of our invention.

(1) *Lower alkyl 4-nitro-2-(tertiary-aminoalkoxy)benzoates*

Preparation of the lower alkyl 4-nitro-2-(tertiary-aminoalkoxy)benzoates is illustrated by the following alternative procedures, all of which involve alkylation of a lower alkyl 4-nitro-2-hydroxybenzoate or a metal salt thereof with a tertiary-aminoalkyl halide, or, stepwise, with a haloalkylating agent such as a haloalkyl para-toluenesulfonate to produce a lower alkyl 4-nitro-2-(haloalkoxy)benzoate which is then treated with a secondary amine to form the desired lower alkyl 4-nitro-2-(tertiary-aminoalkoxy)benzoate.

Ethyl 4-nitro-2-(2-diethylaminoethoxy)benzoate was prepared as follows: To a stirred refluxing solution of 42.2 g. of ethyl 4-nitro-2-hydroxybenzoate in 1000 ml. of absolute alcohol was added slowly a solution of 4.6 g. of sodium in 500 ml. of absolute ethanol. To the resulting deep red solution was added, with stirring over a period of about twenty minutes, 27.1 g. of 2-diethylaminoethyl chloride and the resulting mixture was refluxed for about three hours. An additional 5 g. of 2-diethylaminoethyl chloride was then added and refluxing continued for an additional thirty minutes. The reaction mixture was cooled in ice, filtered, and the filtrate taken to dryness in vacuo. The residue was taken up in 500 ml. of ethyl acetate, the resulting solution filtered and the filtrate taken to dryness, yielding ethyl 4-nitro-2-(2-diethylaminoethoxy)benzoate. This compound was converted into its hydrochloride addition salt by dissolving it in a small amount of ethyl acetate and treating the solution with an excess of 20% ethereal hydrogen chloride solution. The resulting precipitate of ethyl 4-nitro-2-(2-diethylaminoethoxy)benzoate hydrochloride was collected and recrystallized twice from isopropanol, yielding 45.5 g. of purified product, M. P. 144.4–145.2° C. (cor.).

*Anal.*—Calcd. for $C_{15}H_{22}N_2O_5 \cdot HCl$: C, 51.94; H, 6.40; Cl, 10.22. Found: C, 52.08; H, 6.48; Cl, 10.12.

Ethyl 4-nitro-2-(2-diethylaminoethoxy)benzoate was also prepared stepwise as follows: A mixture of 84.4 g. of ethyl 4-nitro-2-hydroxybenzoate, 60.8 g. of powdered anhydrous potassium carbonate and 2000 ml. of meta-xylene was refluxed with stirring under a water trap until no more water was collected (three hours). The water trap was removed and 112.7 g. of 2-chloroethyl para-toluenesulfonate was added in one portion. Refluxing and stirring were continued for an additional nineteen hours. The mixture was filtered while hot and the filter-cake was washed with hot toluene. The combined filtrate and washings were evaporated into dryness in vacuo, yielding a cream-colored solid as residue. Several recrystallizations of this solid from methanol and from n-pentane gave a 60% yield of ethyl 4-nitro-2-(2-chloroethoxy)benzoate as pale yellow platelets, M. P. 56.6–57.2° C. (cor.).

*Anal.*—Calcd. for $C_{11}H_{12}ClNO_5$: Cl, 12.96. Found: Cl, 12.62.

On heating a mixture of ethyl 4-nitro-2-(2-chloroethoxy)benzoate, diethylamine, sodium iodide and absolute ethanol, there was obtained, in only a fair yield, ethyl 4-nitro-2-(2-diethylaminoethoxy)benzoate. Following this same procedure but using dimethylamine or 2-methylpiperidine in place of diethylamine, there is obtained, ethyl 4 - nitro-2-(2-dimethylaminoethoxy)benzoate or ethyl 4-nitro-[2-(2-methyl-1-piperidyl)ethoxy]benzoate, respectively.

Ethyl 4-nitro-2-[3-(1-piperidyl)propoxy]benzoate was prepared as follows: To a stirred refluxing solution of 84.4 g. of ethyl 4-nitro-2-hydroxybenzoate in 1500 ml. of absolute ethanol was added in a fine stream a solution of 9.2 g. of sodium in 500 ml. of absolute ethanol. To the resulting solution was added dropwise over a period of fifteen minutes 65 g. of 3-(1-piperidyl)-propyl chloride and the resulting solution was refluxed for twenty-four hours. The sodium chloride was filtered off and washed with ethyl acetate. The combined filtrate and washings were taken down to dryness under reduced pressure yielding a mixture of an oily residue and a small amount of a red solid. To this mixture was added 2 liters of ether and the insoluble red solid was filtered off. The filtrate was evaporated to dryness under reduced pressure, yielding, as an oily material, ethyl 4-nitro-2-[3-(1-piperidyl)propoxy]benzoate. This ester was converted into its hydrochloride salt by dissolving it in a little ethyl acetate and adding to the solution an excess of ethanolic hydrogen chloride. The solid hydrochloride separated slowly. The mixture was diluted with absolute ether, cooled, and the precipitate was collected and washed with absolute ether. The precipitate was recrystallized three times from isopropanol, yielding, as pale yellow needles, ethyl 4-nitro-2-[3-(1-piperidyl)propoxy]benzoate hydrochloride, M. P. 160.4–161.6° C. (cor.).

*Anal.*—Calcd. for $C_{17}H_{24}N_2O_5 \cdot HCl$: $N_D$, 7.52; Cl, 9.51. Found: $N_D$, 7.37; Cl, 9.33.

$N_D$ stands for total nitrogen as determined by the Dumas method.

n-Butyl 4-nitro - 2 - (2-diethylaminoethoxy)-benzoate was prepared as follows: To a stirred refluxing solution of 9.2 g. of sodium in 2000 ml. of n-butanol was added 95.7 g. of n-butyl 4-nitro-2-hydroxybenzoate. The red insoluble sodium phenolate separated immediately. After addition had been complete, refluxing was continued for an additional ten minutes, and then 54.2 g. of 2-diethylaminoethyl chloride was added dropwise over a period of about twenty minutes. When the addition had been completed, the color had already changed from a deep red to a pale orange-yellow. The reaction mixture was then refluxed for five hours, cooled and filtered. The filtrate was taken down to dryness under reduced pressure yielding an oily residue and a small amount of red solid. This mixture was treated with 2500 ml. of absolute ether, and the red solid was filtered off. The filtrate was taken down to dryness under reduced pressure, yielding, as an oil, the product, n-butyl 4-nitro-2-(2-diethylaminoethoxy)benzoate. This ester was converted into its hydrochloride addition salt by dissolving it in a little absolute ether and treating the solution with an excess of ethereal hydrogen chloride. A pale cream-colored solid separated. The mixture was cooled and the solid was collected and washed with absolute ether. Three recrystallizations of this solid from ethyl acetate yielded, as pale yellow needles, n-butyl 4-nitro-2-(2-diethylaminoethoxy)benzoate hydrochloride, M. P. 117.6–118.6° C. (cor.).

*Anal.*—Calcd. for $C_{17}H_{26}N_2O_5 \cdot HCl$: $N_D$, 7.47; Cl, 9.46. Found: $N_D$, 7.66; Cl, 9.44.

Ethyl 4-nitro-2-(2-dimethylaminoethoxy)benzoate was prepared as follows: To a solution of 126.6 g. of ethyl 4-nitro-2-hydroxybenzoate in 1000 ml. of absolute ethanol was added a solution of 13.8 g. of sodium in 500 ml. of absolute ethanol. The ethanol was then removed by distillation while simultaneously adding toluene (1000 ml.). To the resulting bright red suspension of the sodium salt of ethyl 4-nitro-2-hydroxybenzoate in toluene was added 66.3 g. of 2-dimethylaminoethyl chloride and the mixture was refluxed with stirring for forty-eight hours. The mixture was filtered while hot and the filtercake was washed with hot toluene. The combined filtrate and washings were evaporated in vacuo, leaving a quantitative yield of ethyl 4-nitro-2-(2-dimethylaminoethoxy)benzoate, as an oil. Treatment of an ethyl acetate solution of this compound with an excess of 20% ethereal hydrogen chloride gave a gummy precipitate, which crystallized from isopropanol in pale yellow needles, M. P. 202.2–202.6° C. (cor.). This product was ethyl 4-nitro-2-(2-dimethylaminoethoxy)benzoate hydrochloride.

*Anal.*—Calcd. for $C_{13}H_{18}N_2O_5 \cdot HCl$: $N_D$, 8.79; Cl, 11.12. Found: $N_D$, 8.56; Cl, 11.10.

Additional lower alkyl 4-nitro-2-(tertiary-aminoalkoxy)benzoates prepared according to the above described procedures are given in Table I′.

TABLE I′

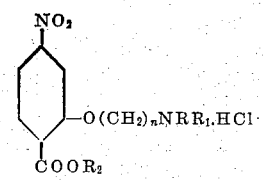

| $n$ | $NRR_1$ | $R_2$ | M. P., ° C. (cor.) | Formula | $N_D$ Calcd. | $N_D$ Found | Cl Calcd. | Cl Found |
|---|---|---|---|---|---|---|---|---|
| 2 | $NC_7H_{14}$ [a] | $CH_2CH_3$ | 153.0–154.0 | $C_{18}H_{26}N_2O_5 \cdot HCl$ | 7.24 | 7.15 | 9.16 | 9.14 |
| 2 | $NC_4H_8O$ [b] | $CH_2CH_3$ | 207.0–208.0 | $C_{15}H_{20}N_2O_6 \cdot HCl$ | 7.77 | 7.81 | 9.83 | 9.92 |
| 3 | $NC_4H_8O$ [b] | $CH_2CH_3$ | 142.0–144.6 | $C_{16}H_{22}N_2O_6 \cdot HCl$ | 7.48 | 7.79 | 9.46 | 9.25 |
| 2 | $NC_5H_{10}$ [c] | $CH_2CH_3$ | 191.0–191.5 | $C_{16}H_{22}N_2O_5 \cdot HCl$ | 7.81 | 7.82 | 9.88 | 9.90 |
| 2 | $NC_4H_8O$ [b] | $CH_3$ | 206.0–206.4 | $C_{14}H_{18}N_2O_6 \cdot HCl$ | [e] 4.04 | [e] 4.05 | 10.22 | 10.21 |
| 2 | $NC_6H_{12}$ [d] | $CH_2CH_3$ | 180.8–182.6 | $C_{17}H_{24}N_2O_5 \cdot HCl$ | 7.52 | 7.22 | 9.51 | 9.38 |
| 3 | $NC_6H_{12}$ [d] | $CH_2CH_3$ | 158.2–159.6 | $C_{18}H_{26}N_2O_5 \cdot HCl$ | 7.24 | 7.03 | 9.16 | 8.92 |
| 3 | $N(C_2H_5)_2$ | $CH_2CH_3$ | 164.8–165.6 | $C_{16}H_{24}N_2O_5 \cdot HCl$ | 7.77 | 7.87 | 9.83 | 9.72 |
| 2 | $N(C_2H_5)_2$ | $CH_2CH_2CH_3$ | 153.4–155.4 | $C_{16}H_{24}N_2O_5 \cdot HCl$ | 7.77 | 7.95 | 9.83 | 9.83 |
| 2 | $N(C_2H_5)_2$ | $CH_3$ | 156.9–159.2 | $C_{14}H_{20}N_2O_5 \cdot HCl$ | 8.42 | 8.38 | 10.65 | 10.50 |

[a] $NC_7H_{14}$=2,6-dimethyl-1-piperidyl.
[b] $NC_4H_8O$=4-morpholinyl.
[c] $NC_5H_{10}$=1-piperidyl.
[d] $NC_6H_{12}$=2-methyl-1-piperidyl.
[e] Nitro nitrogen ($N_{NO_2}$).

Additional lower alkyl 4-nitro-2-(tertiary-aminoalkoxy)benzoates which can be prepared according to the foregoing procedures include the following: ethyl 4-nitro-2-(2-dimethylamino-1-propoxy)benzoate; isobutyl 4-nitro-2-[3-(1-pyrrolidyl)propoxy]benzoate; ethyl 4-nitro-2-[2-(2,5-dimethyl-1-pyrrolidyl)ethoxy]-benzoate; methyl 4-nitro-2-(4-dimethylamino-butoxy)benzoate; n-propyl 4-nitro-2-[2-(di-n-butylamino)ethoxy]benzoate; n-butyl 4-nitro-2-(3-(4-methyl-1-piperidyl)propoxy]benzoate; n-hexyl 4-nitro-2-[2-(3-ethyl-1-piperidyl)ethoxy]-benzoate; n-amyl 4-nitro-2-[3-(2-methyl-1-pyrrolidyl)propoxy]benzoate; and the like.

(2) 4-nitro-2-(tertiary-aminoalkoxy)benzoic acids

These acids are prepared by saponification of the corresponding lower alkyl esters as illustrated by the following examples.

4-nitro-2-(2-diethylaminoethoxy)benzoic acid was prepared as follows: A mixture containing 15 g. of ethyl 4-nitro-2-(2-diethylaminoethoxy)-benzoate monohydrochloride, 18.3 g. of sodium carbonate, 100 ml. of water and 100 ml. of 95% ethanol was refluxed for four hours. The ethanol was removed by distilling in vacuo and the remaining aqueous solution was diluted with water, acidified with concentrated hydrochloric acid and cooled, whereupon some solid separated. The mixture was saturated with ammonium sulfate, whereupon more solid separated. This solid was collected and recrystallized three times from methanol, yielding as pale yellow needles, 4-nitro-2-(2-diethylaminoethoxy)benzoic acid in the form of its monohydrochloride, M. P. 212.5–213.9° C. (cor.).

*Anal.*—Calcd. for $C_{13}H_{18}N_2O_5 \cdot HCl$: C, 48.98; H, 6.01; Cl, 11.12; $N_{NO_2}$, 4.39. Found: C, 49.28; H, 6.13; Cl, 10.92; $N_{NO_2}$, 4.21.

$N_{NO_2}$ stands for nitro nitrogen as determined by titration with standard titanous chloride in glacial acetic acid solution.

4-nitro-2-(2-diethylaminoethoxy)benzoic acid is also obtained following the above procedure but using, in place of ethyl 4-nitro-2-(2-diethylaminoethoxy)benzoate hydrochloride, the corresponding methyl, n-propyl, n-butyl or n-hexyl 4-nitro-2-(2-diethylaminoethoxy)benzoate hydrochloride.

When the above procedure is followed but using, in place of ethyl 4-nitro-2-(2-diethylaminoethoxy)benzoate hydrochloride, ethyl 4-nitro-2-[3-(2-methyl-1-piperidyl)propoxy]benzoate, methyl 4-nitro-2-[2-(4-morpholinyl)-ethoxy]benzoate, ethyl 4-nitro-2-[3-(4-morpholinyl)propoxy]benzoate or ethyl 4-nitro-2-[2-(2,6-dimethyl-1-piperidyl)ethoxy]benzoate, each either in the form of its free base or hydrochloride addition salt, there is obtained, respectively, 4-nitro-2-[3-(2-methyl-1-piperidyl)propoxy]benzoic acid, 4-nitro-2-[2-(4-morpholinyl)ethoxy]benzoic acid, 4-nitro-2-[3-(4-morpholinyl)propoxy]benzoic acid or 4-nitro-2-[2-(2,6-dimethyl-1-piperidyl)ethoxy]benzoic acid.

When the above procedure was followed but using 113 g. of ethyl 4-nitro-2-[3-(1-piperidyl)-propoxy]benzoate monohydrochloride, 128.5 g. of sodium carbonate, 800 ml. of water and 800 ml. of 95% ethanol, and a reflux period of twenty-one hours, there was obtained 4-nitro-2-[3-(1-piperidyl)propoxy]benzoic acid monohydrochloride, M. P. 216.8–217.5° C. (cor.) when recrystallized twice from absolute ethanol.

*Anal.*—Calcd. for $C_{15}H_{20}N_2O_5 \cdot HCl$: Cl, 10.28; $N_D$, 8.16. Found: Cl, 10.09; $N_D$, 8.17.

4-nitro-2-(2-dimethylaminoethoxy)benzoic acid in the form of its monohydrochloride salt was prepared following the above procedure but using 15 g. of ethyl 4-nitro-2-(2-dimethylamino-ethoxy)benzoate, 16.9 g. of sodium carbonate, 100 ml. of water and 100 ml. of 95% ethanol, and a reflux period of sixteen hours. The product, 4-nitro-2-(2-dimethylaminoethoxy)benzoic acid monohydrochloride, melted at 208.0–209.6° C. (cor.) when recrystallized three times from absolute ethanol.

*Anal.*—Calcd. for $C_{11}H_{14}N_2O_5 \cdot HCl$: Cl, 12.20; $N_{NO_2}$, 4.82. Found: Cl, 12.06; $N_{NO_2}$, 4.70.

Additional 4-nitro-2-(tertiary-aminoalkoxy)-benzoic acids which can be prepared according to the foregoing procedure include the following: 4-nitro-2-(2-dimethylamino-1-propoxy)benzoic acid; 4-nitro-2-[3-(1-pyrrolidyl)propoxy]benzoic acid; 4-nitro-2-[2-(2,5-dimethyl-1-pyrrolidyl)-ethoxy]benzoic acid; 4-nitro-2-(4-dimethylamino-butoxy)benzoic acid; 4-nitro-2-[2-(di-n-butyl-amino)ethoxy]benzoic acid; 4-nitro-2-[3-(4-methyl-1-piperidyl)propoxy]benzoic acid; 4-nitro-2-[2-(3-ethyl-1-piperidyl)ethoxy]benzoic acid; 4-nitro-2-[3-(2-methyl-1-pyrrolidyl)propoxy]benzoic acid; and the like.

(3) Tertiary-aminoalkyl 4-nitro-2-(tertiary-aminoalkoxy)benzoates

These esters are prepared preferably by reacting the corresponding 4-nitro-2-(tertiary-amino-alkoxy)benzoic acids with a tertiary-aminoalkyl halide, preferably the chloride, as illustrated by the following examples.

2-diethylaminoethyl 4-nitro-2-(2-diethylaminoethoxy)benzoate was prepared as follows: A mixture containing 15.9 g. of 4-nitro-2-(2-diethylaminoethoxy)benzoic acid monohydrochloride, 8.1 g. of 2-diethylaminoethyl chloride and 200 ml. of isopropanol was refluxed for seven hours and then allowed to stand at room temperature overnight. Rosettes of white needles which had separated were collected. The filtrate was concentrated in vacuo, cooled and diluted with ethyl acetate, whereupon a small amount of additional white solid separated. This solid was collected and combined with the first crop of white needles; the combined crops were dissolved in a little water; and the aqueous solution was treated with an excess of 35% aqueous sodium hydroxide solution. The mixture was saturated with sodium chloride and was extracted exhaustively with ethyl acetate. The ethyl acetate extract was dried over anhydrous calcium sulfate and the ethyl acetate was removed by distilling under reduced pressure, thereby yielding as a straw colored mobile oil, 2-diethylamino-ethyl 4-nitro-2-(2-diethylaminoethoxy)benzoate. This ester was converted into its dihydrochloride salt by dissolving it in a minimum amount of ethyl acetate and adding to the solution an excess of ethereal hydrogen chloride. There separated an oil which solidified when cooled and triturated. The solid was collected and recrystallized three times from absolute ethanol, yielding 2-diethylaminoethyl 4-nitro-2-(2-diethyl-aminoethoxy)benzoate dihydrochloride, M. P. 193.0–193.9° C. (cor.).

*Anal.*—Calcd. for $C_{19}H_{31}N_3O_5 \cdot 2HCl$: C, 50.22; H, 7.32; Cl, 15.61. Found: C, 50.44; H, 7.38; Cl, 15.45.

Following the above procedure but using, in place of 4-nitro-2-(2-diethylaminoethyoxy)benzoic acid monohydrochloride, 4-nitro-2-[3-(2-methyl - 1 - piperidyl)propoxy]benzoic acid, 4-nitro-2-[2-(4-morpholinyl)ethoxy]benzoic acid, 4 - nitro-2-[3 - (4 - morpholinyl)propoxy]benzoic acid or 4-nitro-2-[2-(2,6-dimethyl-1-piperidyl)-ethoxy]benzoic acid, each either in the form of its free base or its monohydrochloride addition salt, there is obtained, respectively, 2-diethylaminoethyl 4-nitro-2-[3-(2 - methyl - 1 - piperidyl) - propoxy]benzoate, 2-diethylaminoethyl 4-nitro 2 - [2 - (4 - morpholinyl)ethoxy]benzoate, 2 - diethylaminoethyl 4-nitro-2-[3-(4 - morpholinyl) - propoxy]benzoate or 2-diethylaminoethyl 4-nitro-2-[2-(2,6 - dimethyl-1-piperidyl)ethoxy]benzoate.

3-(1-piperidyl)propyl 4-nitro-2-(2-diethylaminoethoxy)benzoate was prepared as follows: A mixture containing 31.9 g. of 4-nitro-2-(2-diethylaminoethoxy)benzoic acid monohydrochloride, 19.4 g. of 3-(1-piperidyl)propyl chloride and 600 ml. of isopropanol was refluxed for twenty-three hours. The reaction mixture was cooled, diluted with water and the isopropanol was removed by distilling in vacuo. The remaining aqueous solution was cooled, made alkaline with aqueous sodium hydroxide solution and the liberated oil was taken up with ethyl acetate. The aqueous layer was saturated with sodium chloride and extracted two additional times with ethyl acetate. The combined ethyl acetate layers were dried over anhydrous calcium sulfate. A small amount of solid that separated from the dried ethyl acetate solution was filtered off and the filtrate was concentrated by distilling in vacuo, yielding 3-(1-piperidyl)propyl 4-nitro-2-(2 - diethylaminoethoxy) - benzoate. This ester was converted into its dihydrochloride addition salt by dissolving it, with warming, in a little ethyl acetate, filtering the solution to remove a small amount of insoluble solid, cooling the filtrate and adding thereto an excess of ethereal hydrogen chloride, whereupon a solid separated. The mixture was cooled and diluted with ethyl acetate. The solid was collected and was recrystallized four times from absolute ethanol, yielding 3-(1-piperidyl)propyl 4-nitro - 2 - (2-diethylaminoethoxy)benzoate dihydrochloride, M. P. 214.4-215.2° C. (cor.).

Anal.—Calcd. for $C_{21}H_{33}N_3O_5 \cdot 2HCl$: Cl, 14.76; $N_{NO_2}$, 2.92. Found: Cl, 14.60; $N_{NO_2}$, 3.12.

Following the foregoing procedure but using, in place of 4-nitro-2-(2-diethylaminoethoxy)-benzoic acid monohydrochloride, 4-nitro-2-(2-dimethylaminoethoxy)benzoic acid, 4-nitro-2-[3-(2 - methyl-1-piperidyl)propoxy]benzoic acid, 4-nitro-2-[2 - (2,6 - dimethyl-1-piperidyl)ethoxy]-benzoic acid or 4-nitro-2-[3-(4-morpholinyl)-propoxy]benzoic acid, each either in the form of its free base or its hydrochloride addition salt, there is obtained, respectively, 3-(1-piperidyl)-propyl-4-nitro-2-(2-dimethylaminoethoxy) benzoate, 3 - (1 - piperidyl)propyl 4 - nitro-2-[3-(2-methyl - 1 - piperidyl)propoxy]benzoate, 3 - (1 - piperidyl)propyl 4-nitro-2 - [2-(2,6-dimethyl-1-piperidyl)ethoxy]benzoate or 3-(1 - piperidyl) - propyl 4-nitro-2-[3-(4 - morpholinyl)propoxy]-benzoate.

2-(4-morpholinyl)ethyl 4-nitro-2-(2 - diethylaminoethoxy)benzoate was prepared as follows: A mixture containing 31.9 g. of 4-nitro-2-(2-diethylaminoethoxy)benzoic acid monohydrochloride, 18 g. of 2-(4-morpholinyl)ethyl chloride and 600 ml. of absolute ethanol was refluxed for twenty hours, filtered while hot and then concentrated in vacuo to remove the solvent. The oily residue crystallized when triturated with dry acetone. This crystalline solid was collected, washed with ethyl acetate and dissolved in water. The aqueous solution was made alkaline with ammonium hydroxide and the oil that separated was taken up with ethyl acetate. The aqueous layer was saturated with sodium chloride and extracted two additional times with ethyl acetate. The combined ethyl acetate extracts were dried over anhydrous calcium sulfate. Some solid material that separated from the dried ethyl acetate solution was filtered and the filtrate was concentrated in vacuo to yield a small amount of oily product, 2-(4-morpholinyl)ethyl 4-nitro-2-(2-diethylaminoethoxy)benzoate. The oily product was converted into its dihydrochloride by dissolving it, with warming, in a minimum quantity of ethyl acetate, filtering to remove some insoluble material, cooling the filtrate and adding thereto an excess of ethereal hydrogen chloride, whereupon an oil separated. The mixture was diluted with absolute ether to insure complete precipitation. The solvents were removed by decantation and the oily material crystallized when triturated with dry acetone. The crystalline product was recrystallized three times from absolute ethanol, yielding 2-(4-morpholinyl)ethyl 4-nitro-2-(2 - diethylaminoethoxy)benzoate dihydrochloride, M. P. 217.0-218.0° C. (cor.).

Anal.—Calcd. for $C_{19}H_{29}N_3O_3 \cdot 2HCl$: Cl, 15.14; $N_{NO_2}$ 2.99. Found: Cl, 14.90; $N_{NO_2}$, 2.95.

3 - (1-piperidyl)propyl 4-nitro-2-[3-(1-piperidyl)propoxy]benzoate was prepared as follows: A mixture containing 34.5 g. of 4-nitro-2-[3-(1-piperidyl)propoxy]benzoic acid monohydrochloride, 19.4 g. of 3-(1-piperidyl)propyl chloride and 600 ml. of isopropanol was refluxed for twenty-four hours, evaporated under reduced pressure to remove this solvent, thereby yielding a solid residue. The solid was suspended in ethyl acetate, filtered and washed with ethyl acetate. This solid was dissolved in water, the solution was treated with concentrated ammonium hydroxide and the oil that separated was extracted with ether. The ether extract was dried over anhydrous calcium sulfate. Removal of the ether under reduced pressure yielded the oily product, 3 - (1 - piperidyl)propyl 4-nitro-2-[3-(1-piperidyl)-propoxy]benzoate. This ester was converted into its dihydrochloride salt as follows: To a solution of 23 g. of 3-(1-piperidyl)propyl 4-nitro-2 - [3 - (1-piperidyl)propoxy]benzoate dissolved in a minimum amount of ethyl acetate was added an excess of ethereal hydrogen chloride, whereupon a white solid separated. The mixture was diluted with ethyl acetate and allowed to stand for one hour. The solid was filtered, washed with ethyl acetate and then recrystallized once from absolute ethanol-isopropanol and once from absolute ethanol, yielding, as rosettes of cottony white needles, 3-(1-piperidyl)propyl 4-nitro - 2 - [3-(1-piperidyl)propoxy]benzoate dihydrochloride, M. P. 213.0-214.1° C. (cor.).

Anal.—Calcd. for $C_{23}H_{35}N_3O_5 \cdot 2HCl$: Cl, 14.00; $N_{NO_2}$, 2.77. Found: Cl, 13.70; $N_{NO_2}$, 2.88.

Additional tertiary-aminoalkyl 4-nitro-2-(tertiary-aminoalkoxy)-benzoates which can be prepared according to the foregoing procedure include the following: 4-diethylaminobutyl 4-nitro - 2- (2 -dimethylamino-1-propoxy)benzoate; 3 - (1 - pyrrolidyl)propyl 4-nitro-2-[3-(1-pyrrolidyl) - propoxy]benzoate; 2 - dimethylaminoethyl 4 - nitro-2-[2-(2,5-dimethyl-1-pyrrolidyl) - ethoxy]benzoate; 3 - (2 - methyl-1-pyrrolidyl) - propyl 4 - nitro-2-(4-dimethylaminobutoxy)benzoate; 2 - (2,6-dimethyl-1-piperidyl)ethyl 4-nitro - 2 - [2 - (di-n-butylamino)ethoxy]benzoate; 2-di-n-butylaminoethyl 4-nitro-2-[3-(4-methyl-1-piperidyl)propoxy]benzoate; 2 - (3 - ethyl-1-piperidyl) - ethyl 4-nitro-2-[2-(3-ethyl-1-piperidyl)ethoxy]benzoate; 3-(4-morpholinyl)-propyl 4 - nitro-2-[3-(2-methyl-1-pyrrolidyl)propoxy]benzoate; and the like.

(4) *Tertiary-aminoalkyl 4-amino-2-(tertiary-aminoalkoxy)benzoates*

These esters can be prepared by reduction of the corresponding tertiary-aminoalkyl 4-nitro-2-(tertiary-aminoalkoxy)benzoates. This procedure is illustrated as follows.

2 - diethylaminoethyl 4-amino-2-(2-diethylaminoethoxy)benzoate can be prepared as follows: To a solution of 4.5 g. of 2-diethylaminoethyl 4-nitro-2-(2-diethylaminoethoxy)benzoate dihydrochloride in 150 ml. of ethanol is added 0.3 g. of platinum oxide monohydrate, and the mixture is treated with hydrogen at 50 lbs. per square inch of pressure at room temperature. The reduction is rapid and exothermic. The catalyst is filtered off and the filtrate is evaporated to dryness under reduced pressure, yielding a solid residue of 2-diethylaminoethyl 4-amino-2-(2-diethylaminoethoxy)benzoate in the form of its dihydrochloride, which can be recrystallized from absolute ethanol to yield a substantially pure product. The dimethiodide salt of this ester melts at 210.5–211.9° C. (cor.).

Following the above procedure but using, in place of 2-diethylaminoethyl 4-nitro-2-(2-diethylaminoethoxy)benzoate dihydrochloride, 3-(1 - piperidyl)propyl 4-nitro-2-(2-diethylaminoethoxy)benzoate, 2-(4-morpholinyl)ethyl 4-nitro - 2 - (2-diethylaminoethoxy)benzoate, 3-(1-piperidyl)propyl 4-nitro-2 - [3-(1-piperidyl)propoxy]benzoate, 2-diethylaminoethyl 4-nitro-2-[3 - (2-methyl-1-piperidyl)propoxy]benzoate, 2-diethylaminoethyl 4-nitro-2-[2-(4-morpholinyl)-ethoxy]benzoate, 2-diethylaminoethyl 4-nitro-2-[3-(4-morpholinyl)propoxy]benzoate or 2-diethyl - aminoethyl 4-nitro-2-[2-(2,6-dimethyl-1-piperidyl)ethoxy]benzoate, each either in its free base form or in the form of its dihydrochloride addition salt, there is obtained, respectively, 3-(1-piperidyl) - propyl 4 - amino-2-(2-diethylaminoethoxy)benzoate, 2 - (4 - morpholinyl)ethyl 4-amino-2-(2-diethylaminoethoxy)benzoate, 3-(1-piperidyl) - propyl 4 - amino-2-[3-(1-piperidyl)propoxy]benzoate, 2-diethylaminoethyl 4-amino-2 - [3 - (2-methyl-1-piperidyl)propoxy]benzoate, 2-diethylamino 4 - amino-2-[2-(4-morpholinyl)-ethoxy]benzoate, 2-diethylaminoethyl 4-amino-2-[3-(4-morpholinyl)propoxy]benzoate or 2-diethylaminoethyl 4-amino - 2 - [2-(2,6-dimethyl-1-piperidyl)-ethoxy]benzoate.

Additional tertiary-aminoalkyl 4 - amino-2-(tertiary-aminoalkoxy)-benzoate which can be prepared according to the foregoing procedure include the following: 4-diethylaminobutyl 4-amino - 2 - (2-dimethylamino-1-propoxy)benzoate; 3-(1-pyrrolidyl)propyl 4-amino-2-[3-(1-pyrrollidyl)propoxy]benzoate; 2-dimethylaminoethyl 4-amino-2-[2-(2,5-dimethyl-1-pyrrolidyl)-ethoxy]benzoate; 3 - (2 - methyl-1-pyrrolidyl)-propyl 4-amino-2-(4-dimethylaminobutoxy)benzoate; 2 - (2,6 - dimethyl-1-piperidyl)ethyl 4-amino - 2-[2-(di-n-butylamino)ethoxy]benzoate; 2 - di - n - butylaminoethyl 4 - amino-2-[3-(4-methyl-1-piperidyl)propoxy]benzoate; 2-(3-ethyl - 1 - piperidyl)ethyl 4-amino-2-[2-(3-ethyl-1-piperidyl)ethoxy]benzoate; 3-(4-morpholinyl)-propyl 4 - amino-2-[3-(2-methyl-1-pyrrolidyl)-propoxy]benzoate; and the like.

We claim:
1. A compound having the formula

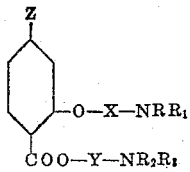

where Z is a member of the group consisting of nitro and amino, X and Y are each lower alkylene radicals whose two free valence bonds are on different carbon atoms, and $NRR_1$ and $NR_2R_3$ are each members of the group consisting of dialkylamino, 1-piperidyl, (lower alkylated)-1-piperidyl, 1-pyrrolidyl, (lower alkylated)-1-pyrrolidyl and 4-morpholinyl.

2. A compound having the formula

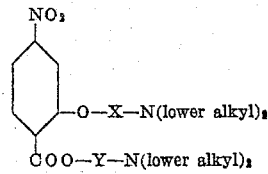

where X and Y are each lower alkylene radicals whose two free valence bonds are on different carbon atoms.

3. A compound having the formula

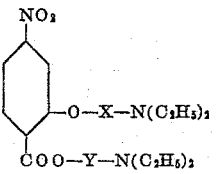

where X and Y are each lower alkylene radicals whose two free valence bonds are on different carbon atoms.

4. A compound having the formula

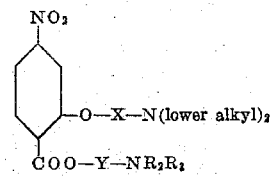

where X and Y are each lower alkylene radicals whose two free valence bonds are on different carbon atoms and $NR_2R_3$ is a 1-piperidyl radical.

5. A compound having the formula

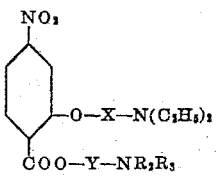

where X and Y are each lower alkylene radicals whose two free valence bonds are on different carbon atoms and $NR_2R_3$ is a 1-piperidyl radical.

6. A compound having the formula

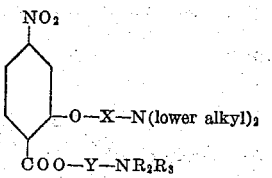

where X and Y are each lower alkylene radicals whose two free valence bonds are on different carbon atoms and $NR_2R_3$ is a 4-morpholinyl radical.

7. A compound having the formula

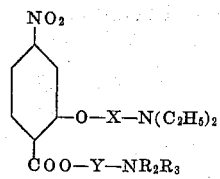

where X and Y are each lower alkylene radicals whose two free valence bonds are on different carbon atoms and $NR_2R_3$ is a 4-morpholinyl radical.

8. A compound having the formula

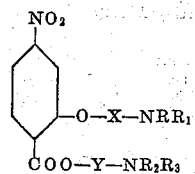

where X and Y are each lower alkylene radicals whose two free valence bonds are on different carbon atoms, and $NRR_1$ and $NR_2R_3$ are each 1-piperidyl radicals.

9. A process for the preparation of a compound having the formula

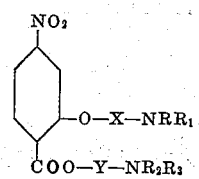

where X and Y are each lower alkylene radicals whose two free valence bonds are on different carbon atoms, and $NRR_1$ and $NR_2R_3$ are each members of the group consisting of dialkylamino, 1-piperidyl, (lower alkylated)-1-piperidyl, 1-pyrrolidyl, (lower alkylated)-1-pyrrolidyl and 4-morpholinyl, which comprises heating the corresponding 4-nitro-2-(tertiary-aminoalkoxy)benzoic acid with a tertiary-aminoalkyl halide having the formula, halogen—Y—$NR_2R_3$.

10. A process for the preparation of a compound having the formula

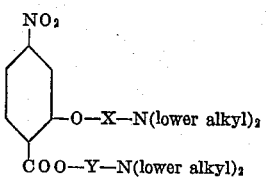

where X and Y are each lower alkylene radicals whose two free valence bonds are on different carbon atoms, which comprises heating the corresponding 4-nitro-2-(dialkylaminoalkoxy)benzoic acid with a dialkylaminoalkyl halide having the formula, halogen—Y—N(lower alkyl)$_2$.

11. A process for the preparation of a compound having the formula

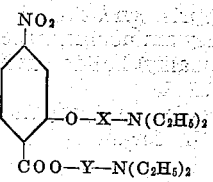

where X and Y are each lower alkylene radicals whose two free valence bonds are on different carbon atoms, which comprises heating the corresponding 4-nitro-2-(diethylaminoethoxy)benzoic acid with a diethylaminoalkyl halide having the formula, halogen—Y—$N(C_2H_5)_2$.

12. A process for the preparation of a compound having the formula

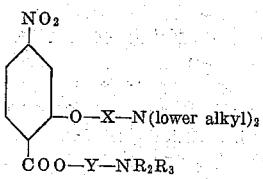

where X and Y are each lower alkylene radicals whose two free valence bonds are on different carbon atoms and $NR_2R_3$ is a 1-piperidyl radical, which comprises heating the corresponding 4-nitro-2-(dialkylaminoalkoxy)benzoic acid with a tertiary-aminoalkyl halide having the formula, halogen—Y—$NR_2R_3$.

13. A process for the preparation of a compound having the formula

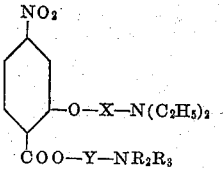

where X and Y are each lower alkylene radicals whose two free valence bonds are on different carbon atoms and $NR_2R_3$ is a 1-piperidyl radical, which comprises heating the corresponding 4-nitro-2-(diethylaminoalkoxy)benzoic acid with a tertiary-aminoalkyl halide having the formula, halogen—Y—$NR_2R_3$.

14. A process for the preparation of a compound having the formula

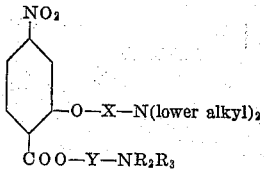

where X and Y are each lower alkylene radicals whose two free valence bonds are on different carbon atoms and $NR_2R_3$ is a 4-morpholinyl radical, which comprises heating the corresponding 4-nitro-2-(dialkylaminoalkoxy)benzoic acid with a tertiary-aminoalkyl halide having the formula, halogen—Y—$NR_2R_3$.

15. A process for the preparation of a compound having the formula

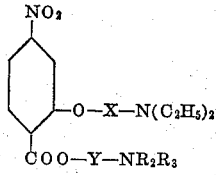

where X and Y are each lower alkylene radicals whose two free valence bonds are on different carbon atoms and NR₂R₃ is a 4-morpholinyl radical, which comprises heating the corresponding 4-nitro-2-(diethylaminoalkoxy)benzoic acid with a tertiary-aminoalkyl halide having the formula, halogen—Y—NR₂R₃.

16. A process for the preparation of a compound having the formula

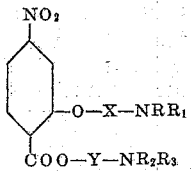

where X and Y are each lower alkylene radicals whose two free valence bonds are on different carbon atoms, and NRR₁ and NR₂R₃ are each 1-piperidyl radicals, which comprises heating the corresponding 4-nitro-2-(tertiary-aminoalkoxy)benzoic acid with a tertiary-aminoalkyl halide having the formula, halogen—Y—NR₂R₃.

17. 2-diethylaminoethyl 4-nitro-2-(2-diethylaminoethoxy)benzoate having the formula

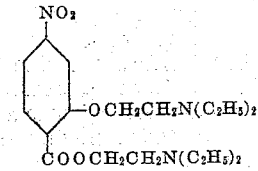

18. 3-(1-piperidyl)propyl 4-nitro-2-(2-diethylaminoethoxy)benzoate having the formula

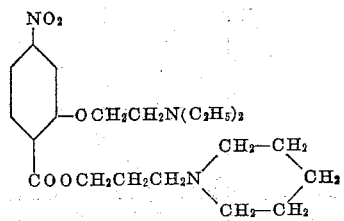

19. 2-(4-morpholinyl)ethyl 4-nitro-2-(2-diethylaminoethoxy)benzoate having the formula

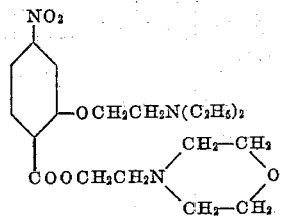

20. 3-(1-piperidyl)propyl 4-nitro-2-[3-(1-piperidyl)propoxy]benzoate having the formula

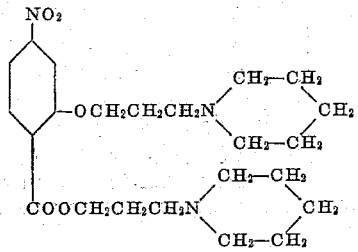

21. A compound having the formula

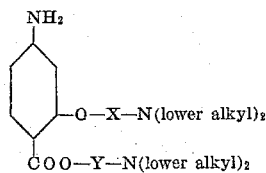

where X and Y are each lower alkylene radicals whose two free valence bonds are on different carbon atoms.

22. A compound having the formula

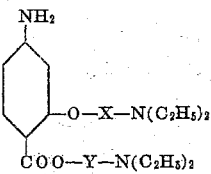

where X and Y are each lower alkylene radicals whose two free valence bonds are on different carbon atoms.

23. 2-diethylaminoethyl 4-amino-2-(2-diethylaminoethoxy)benzoate having the formula

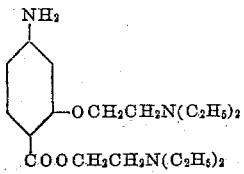

RAYMOND O. CLINTON.
STANLEY C. LASKOWSKI.

No references cited.